3,013,025
19-HYDROXY STEROIDS AND METHODS OF
MAKING SAME
Alejandro Zaffaroni, Mexico City, Mexico, assignor to Syntex S.A., Mexico City, Mexico, a corporation of Mexico
No Drawing. Filed Dec. 7, 1955, Ser. No. 551,534
Claims priority, application Mexico Dec. 8, 1954
17 Claims. (Cl. 260—397.1)

The present invention relates to a novel method for the preparation of cyclopentanophenanthrene derivatives and to a novel process for the production and utilization thereof.

More particularly the present invention relates to certain novel 19-hydroxy steroids, a process for the production of these steroids and a process for the production of 19-nor-steroidal hormones therefrom.

It is known that 19-nor derivatives of steroidal hormones are extremely active substances and in many instances many times more active and/or have more desirable hormonal qualities than their corresponding substances having an angular methyl group at C–10 of the steroidal molecule.

In accordance with the present invention, the surprising discovery has been made that in the process described and claimed in U.S. Patent No. 2,671,752, which is directed to the production of corticosterone from desoxycorticosterone by incubation with adrenal glands, there is present in the mother liquid heretofore discarded a substantial quantity, i.e. from 2 to 5% of the total steroidal material of $\Delta^4$-pregnene-19,21-diol-3,20-dione. It has been found in accordance with the present invention that upon chromatography of the mother liquors this substance can be isolated. There has further been discovered in accordance with the present invention that $\Delta^4$-pregnene-19,21-diol-3,20-dione can be utilized for the production of the new 19-hydroxy steroids, especially 19-hydroxy-$\Delta^4$-androstene derivatives such as 19-hydroxy-testosterone and its esters, the 19-triphenylmethyl ether of 19-hydroxy testosterone, 19-hydroxy-$\Delta^4$-androstene-3,17-dione and its esters, the 19-triphenylmehyl ether of 19-hydroxy androstenedione, and 3-keto-19-hydroxy-$\Delta^4$-etiocholenic acid. Further, in accordance with the present invention, it has been discovered that these 19-hydroxy compounds and/or their esters may be subjected to the removal of the element of formaldehyde with the production of the corresponding 19-nor-derivatives. These 19-nor-derivatives, as for example, 19-nortestosterone, are in themselves valuable steroid hormones, 19-nortestosterone having valuable anabolic properties. Further, these 19-nor derivatives may be utilized for the preparation of the active norethinyltestosterone and nor-methyltestosterone, norandrostenedione being acapable of being transformed into norethinyltestosterone and nor-methyltestosterone according to the process set forth in U.S. application No. 320,154, filed November 12, 1952, now Patent No. 2,744,122, issued May 1, 1956. Further, 3-keto-19-nor-$\Delta^4$-etiocholenic acid may be utilized for the preparation of 19-nordesoxycorticosterone according to the method set forth in U.S. application Serial No. 484,064, filed January 25, 1955, now Patent No. 2,925,-427 issued Feb. 16, 1960.

The process of the present invention may be set forth in part by the following equation:

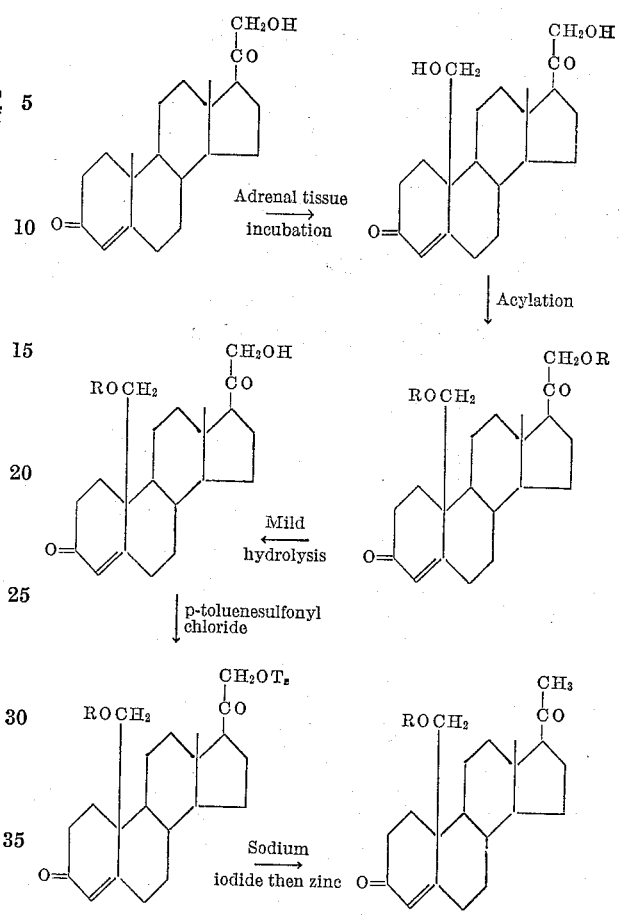

Referring to the above equation, R represents an aliphatic ester group of less than 10 carbon atoms, particularly a lower fatty acid ester such as acetic or propionic, and $T_s$ represents the tosyl radical.

Referring to the above equation, desoxycorticosterone is incubated with adrenal tissue in accordance with the conditions set forth in my aforementioned U.S. Patent No. 2,671,752, which briefly involves adding a solution of desoxycorticosterone to an incubation mixture of fresh, finely divided animal adrenal tissue and a physiological saline solution containing potassium and magnesium ions and a buffer capable of maintaining a pH of from 6.8 to 7.8. In addition, the saline solution contains a salt selected from the class consisting of alkali metal fumarates and citrates. The mixture is then incubated under agitation at a temperature of between 5° and 45° C. for at least one-half hour. As pointed out in the aforementioned patent, the adrenal tissue was preferably present in amount equal to from one part of tissue to one to five parts by volume of buffer solution and the starting compound is preferably present in the amount of approximately equal to one part of compound to a thousand parts of tissue, the alkali metal salt being present in an amount equal to at least two and one-half mols to each 200 parts by weight of the buffer solution. After the incubation the reaction mixture is extracted with chloroform or other suitable solvent and using a column of silica there is separated by chromatographic means corticosterone in high yield. The remaining mother liquor after the separation of corticosterone is subjected again to chromatographic separation and Δ⁴-pregnene-19,20-diol-3,20-dione is then separated in a yield of about 4%.

For the second step of the equation just outlined the Δ⁴-pregnene-19,21-diol-3,20-dione is subjected to conventional esterification, preferably with a lower fatty acid anhydride to prepare as for example the diacetate of Δ⁴-pregnene-19,21-diol-3,20-dione. The diacetate is then subject to partial saponification to prepare the corresponding 19-monoacetate of Δ⁴-pregnene-19,21-diol-3,20-dione. The resultant monoacetate is then treated with p-toluenesulfonyl chloride to prepare the 19-acetate-21-toluenesulfonate of Δ⁴-pregnene-19,21-diol-3,20-dione. This substance is then heated with sodium iodide or other alkali metal iodide preferably in an organic solvent such as acetone to prepare the corresponding 21-iodo compound, and this 21-iodo compound is then treated with zinc dust and glacial acetic acid to remove the iodine. There is thus prepared the novel acetate of Δ⁴-pregnene-19-ol-3,20-dione.

Another portion of the invention herein set forth may be exemplified by the following equation:

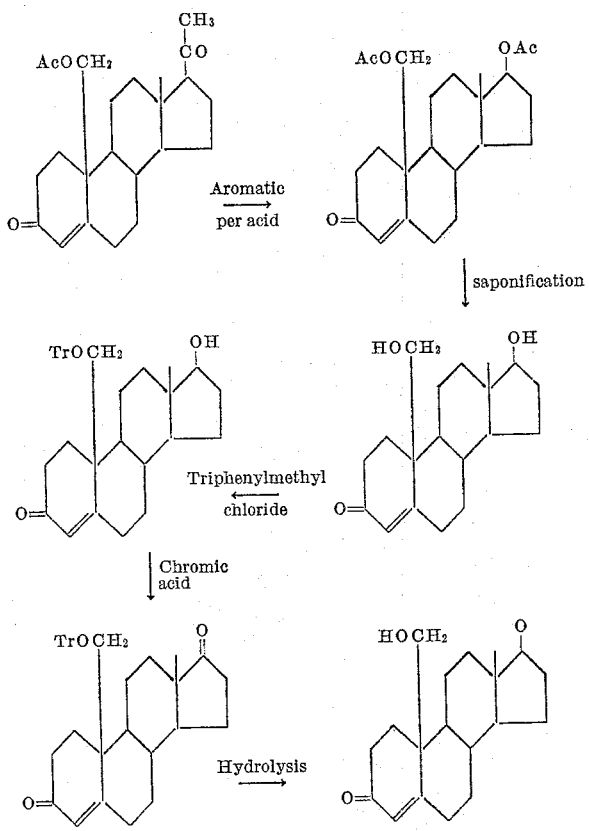

In the above equation, Ac represents by way of example the acetate group, and $T_r$ represents the triphenylmethyl group. In practicing the process above outlined, the ester, i.e., the acetate of Δ⁴-pregnene-19-ol-3,20-dione is treated with an aromatic peracid as for example perbenzoic acid, for a period of approximately three days at a slightly elevated temperature, as for example between 25° and 30° C. There is produced as one of the products of this reaction, the diacetate of Δ⁴-androstene-17β-19-diol-3-one. This compound could be saponified with sodium carbonate or other relatively weak alkali to give the corresponding Δ⁴-androstene-17β-19-diol-3-one. This last-mentioned compound was then treated with triphenylmethyl chloride in the presence of pyridine to form the corresponding triphenylmethyl ether. Upon oxidation of this ether, as for example with chromic acid, followed by hydrolysis, there was formed the 19-triphenylmethyl- ate of Δ4-androstene-19-ol-3,17-dione. This compound could also be transformed to the corresponding free Δ⁴-androstene-19-ol-3,17-dione by treatment with a cold saturated solution of dry hydrogen chloride in chloroform. Another portion of the process of the present invention may be exemplified by the following equation:

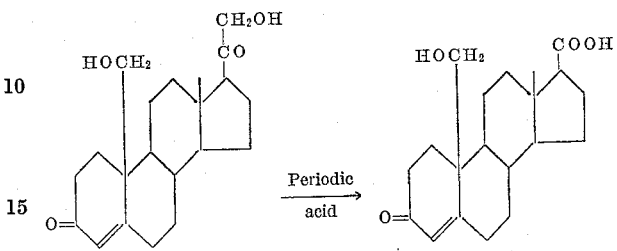

As indicated in the foregoing equation Δ⁴-pregnene-19,21-diol-3,20-dione when treated with periodic acid produces 19-hydroxy-3-keto-Δ⁴-etiocholenic acid.

The production of 19-nor-compounds from 19-hydroxy compounds and/or derivatives thereof is indicated in the following equation:

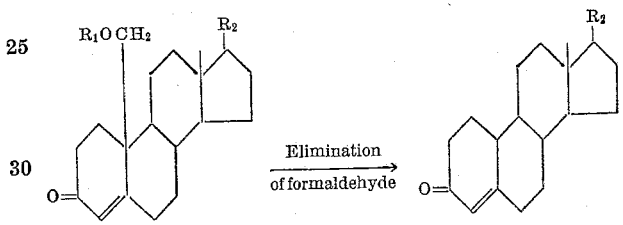

In the above equation $R_1$ represents hydrogen or $R_1$ represents an aliphatic ester, especially the residue of the hydrocarbon carboxylic acid of less than 10 carbon atoms, and particularly a lower fatty acid such as acetic or propionic. $R_2$ represents the conventional side chains of steroidal compounds, and especially the keto and hydroxy side chains of androstene compounds, the side chains $COCH_3$ and $COCH_2OH$ of pregnene compounds, or the COOH of etiocholenic acid.

In practicing the process above outlined the 19-hydroxy compound or its ester is dissolved in an organic solvent preferably a lower aliphatic alcohol such as methanol or ethanol, and a strong base preferably an alkali metal hydroxide such as sodium hydroxide in aqueous solution is added thereto. The mixture is then kept for a substantial period of time, i.e. of the order of three hours, at an elevated temperature, as for example 50° C. In this way there is produced from either the 19-ester or the 19-hydroxy compounds the corresponding 19-nor compounds.

The following specific examples serve to illustrate but are not intended to limit the present invention.

*Example 1*

The suprarenal glands of swine or bovine, recently slaughtered, were first ground in a meat grinder, and 500 parts (by weight) of the minced glands thus obtained were stirred with 1500 parts of a solution obtained by mixing 40 parts of a 4.5% sodium chloride solution, 1.6 parts of a 5.75% potassium chloride solution, 0.4 parts of a 19.1% solution of magnesium sulfate heptahydrate, 20 parts of a buffer solution of 0.1 M of monobasic sodium phosphate and dibasic sodium phosphate having a pH of 7.4, 30 parts of a 0.15 M solution of sodium fumarate (or sodium citrate) and 110 parts of water. The solution had a pH of around 7.4 and a temperature of 37° C. when it was added to the minced glands. One part of desoxycorticosterone, previously dissolved in 30 parts of propyleneglycol, was then added and the mixture was incubated for two hours at a temperature of 37° C., under strong stirring. After this time, the reaction mixture was extracted with chloroform using a centrifuge to attain a clean separation of the phases. By chromatographic separation, using a column of silica, there was obtained corticosterone in 75% yield and, after a second chromatogram, approximately 4% of $\Delta^4$-pregnene-19,21-diol-3,20-dione, whose polarity is very similar to that of corticosterone. It has a melting point of 163°–164° C.

Example II 4 g. of the 19-monoacetate of $\Delta^4$-pregnene-19,21-diol-3,20-dione (obtained from $\Delta^4$-pregnene-19,21-diol-3,20-dione by acetylation with acetic anhydride and pyridine overnight followed by partial saponification with potassium bicarbonate) was dissolved in a mixture of 3 cc. of pyridine and 27 cc. of dry chloroform free of alcohol and mixed with 4.7 g. of p-toluenesulfonyl chloride and the mixture was kept standing for one day under anhydrous conditions. It was then diluted with ether, washed with dilute hydrochloric acid, sodium carbonate solution and water until neutral, dried over sodium sulfate and evaporated to dryness.

Chromatography of a small sample of this residue in a column of activated alumina afforded the 19-acetate 21-toluenesulfonate of $\Delta^4$-pregnene-19,21-diol-3,20-dione in pure form.

The crude residue was heated for five minutes with a solution of 8 g. of sodium iodide in 100 cc. of acetone, when a precipitate of sodium toluenesulfonate formed. The acetone was evaporated under vacuum and the residue was treated with 40 cc. of glacial acetic acid. The brown solution thus obtained was stirred with 1 g. of zinc dust until complete decoloration and the solution was again evaporated under vacuum. The residue was digested with water and ether and the ether solution was washed with dilute hydrochloric acid, sodium carbonate solution and water, dried with sodium sulfate and evaporated to a volume of 15–20 cc. Hexane was added until crystallization started and then it was left to crystallize in the ice bath. Filtration yielded 2.5 g. of the acetate of $\Delta^4$-pregnene-19-ol-3,20-dione.

Example III 400 mg. of the acetate of $\Delta^4$-pregnene-19-ol-3,20-dione was added to a solution of 150 mg. of perbenzoic acid in 1.9 cc. of chloroform and the mixture was kept for three days at a temperature of 25–30° C. and then diluted with ether. The ether solution was washed with dilute sodium carbonate solution and water and evaporated to dryness. The residue was chromatographed on activated alumina, thus giving as a main fraction a substance which showed the characteristic reactions of a lactone and, besides 120 mg. of the diacetate of $\Delta^4$-androstene-17$\beta$,19-diol-3-one which showed infrared bands at 1736 and 1660 cm.$^{-1}$.

Example IV 250 cc. of a 13% aqueous sodium hydroxide solution was added to a solution of 1 g. of the diacetate of $\Delta^4$-androstene-17$\beta$,19-diol-3-one in 600 cc. of methanol (ethanol can be used alternatively) and the mixture was kept for three hours at a temperature of 50° C. During this time a crystalline substance separated which was collected and crystallized from hexane, thus yielding 780 mg. of 19-nor-testosterone with a melting point of 110°–111° C.

Example V 1.2 g. of sodium carbonate previously dissolved in 6 cc. of water was added to a solution of 2 g. of the diacetate of $\Delta^4$-androstene-17$\beta$,21-diol-3-one and the mixture was kept standing at a temperature of 20° C. After pouring into water, the precipitate was filtered, washed to neutral and dried to constant weight, to give $\Delta^4$-androstene-17$\beta$,19-diol-3-one.

1.5 g. of this androstenediolone, 1.7 g. of triphenylmethyl chloride and 5 cc. of pyridine was heated together under anhydrous conditions on the steam bath for 4 hours. The product formed during this reaction was dissolved in ether and the ether solution was washed with dilute hydrochloric acid, with sodium bicarbonate solution and water, dried and evaporated to dryness. The residue was dissolved in a mixture benzene-hexane and chromatographed in a column with activated alumina. Besides other fractions which were discarded, there was obtained 830 mg. of 19-triphenylmethylate of $\Delta^4$-androstene-17$\beta$,19-diol-3-one.

A solution of 150 mg. of chromic acid in 4 cc. of pyridine was slowly added to a solution of 800 mg. of the 19-triphenylmethylate of $\Delta^4$-androstene-17$\beta$,19-diol-3-one in 6 cc. of pyridine and the mixture was kept standing at room temperature for six hours and then poured into water. The product was extracted with ether and the ether solution was washed with cold dilute hydrochloric acid until the smell of pyridine disappeared and then with sodium bicarbonate solution and water, dried and evaporated to dryness, thus leaving as a residue the triphenylmethylate of $\Delta^4$-androsten-19-ol-3,17-dione.

A solution of 750 mg. of this triphenylmethlate in 20 cc. of chloroform was cooled in an ice-salt bath and then mixed with 50 cc. of a cold saturated solution of dry hydrogen chloride in chloroform. After keeping the mixture at room temperature for thirty minutes, it was washed with sodium bicarbonate solution and water, dried and evaporated to dryness. Chromatography in a column of activated alumina yielded in the ether eluates 380 mg. of $\Delta^4$-androsten-19-ol-3,17-dione. Treatment with this compound with aqueous sodium hydroxide in accordance with the method described in Example IV afforded 300 mg. of $\Delta^4$-19-nor-androstene-3,17-dione with a melting point of 163°–166° C.

This same compound was also obtained by refluxing a solution of the triphenylmethylate of $\Delta^4$-androsten-19-ol-3,17-dione with 10 volumes of acetic acid and 3 volumes of concentrated hydrochloric acid for thirty minutes, followed by the usual methods of purification.

Example VI 1 g. of the acetate of $\Delta^4$-pregnen-19-ol-3,20-dione was treated in accordance with the method described in Example IV, thus yielding 750 mg. of nor-progesterone with a melting point of 144°–145° C.

Example VII 1 g. of $\Delta^4$-pregnene-19,21-diol-3,20-dione dissolved in 30 cc. of ethanol was treated with a stoichiometirc amount (540 mg.) of periodic acid in the form of a 0.1 normal solution. This solution was prepared by dissolving sodium periodate in water and acidifying with sulfuric acid to a pH between 2 and 3. The mixture was kept standing for two hours, during which time crystals separated of 19-hydroxy-3-keto-$\Delta^4$-etiocholenic acid. For its purification, the acid was extracted with chloroform, the chloroform solution was treated with aqueous sodium carbonate solution to form the sodium salt and the aqueous solution was acidified with 2-normal sulfuric acid. The 19-hydroxy-3-keto-$\Delta^4$-etiocholenic acid separated in the form of crystals with a melting point of 220°–222° C.

25 cc. of a 13% aqueous solution of sodium hydroxide was added to 500 mg. of 19-hydroxy-3-keto-$\Delta^4$-etiocholenic acid dissolved in 30 cc. of methanol and the mixture was kept for eight hours at a temperature between 50° and 70° C. (the same result is obtained by leaving the mixture at room temperature for 20 hours). The solution was then acidified with dilute sulfuric acid and the precipitate formed was collected and crystallized from chloroform, thus affording 320 mg. of the crystalline 19-nor-3-keto-$\Delta^4$-etiocholenic acid with a melting point of 257°–258° C.

I claim:

1. A process for the production of the diacetate of $\Delta^4$-androstene-17$\beta$, 19-diol-3-one comprising oxidizing the acetate of $\Delta^4$-pregnene-19-ol-3,20-dione with an aromatic per acid.

2. A process for the production of a compound selected from the class consisting of 19-nor androstanes, 19-nor pregnanes and 19-nor etiocholenic acids comprising eliminating formaldehyde from the corresponding 19-hydroxy derivative by reaction with a strong alkali.

3. The process of claim 2 wherein the elimination of formaldehyde is carried out by reaction with a dilute solution of sodium hydroxide in a lower aliphatic alcohol.

4. A process for the preparation of 19-nortestosterone comprising treating a compound selected from the class consisting of 19-hydroxytestosterone and hydrocarbon carboxylic esters of less than 10 carbon atoms thereof with a strong alkali.

5. The process of claim 4 wherein the strong alkali is a dilute solution of sodium hydroxide in methanol.

6. A process for the preparation of 19-norprogesterone comprising treating a compound selected from the class consisting of 19-hydroxyprogesterone and its hydrocarbon carboxylic esters of less than 10 carbon atoms with a strong alkali.

7. The process of claim 6 wherein the strong alkali is a dilute solution of sodium hydroxide in methanol.

8. A process for the preparation of 19-norandrostenedione comprising treating a compound selected from the class consisting of 19-hydroxyandrostenedione and its hydrocarbon carboxylic esters of less than 10 carbon atoms with a strong alkali.

9. The process of claim 8 wherein the strong alkali is sodium hydroxide in dilute methanol solution.

10. A process for the preparation of 19-nor-3-keto-$\Delta^4$-etiocholenic acid comprising treating a compound selected from the class consisting of 19-hydroxy-3-keto-$\Delta^4$-etiocholenic acid and its hydrocarbon carboxylic esters of less than 10 carbon atoms with a strong alkali.

11. The process of claim 10 wherein the strong alkali is sodium hydroxide in a dilute methanol solution.

12. A process for the preparation of 19-norandrostenedione comprising treating the triphenylmethyl ether of 19-hydroxy-androstenedione with a mixture of concentrated hydrochloric acid and acetic acid.

13. 19-hydroxytestosterone.

14. The diacetate of 19-hydroxytestosterone.

15. 19-triphenylmethyl ether of 19-hydroxytestosterone.

16. 19-hydroxy-$\Delta^4$-androstene-3,17-dione.

17. The 19-triphenylmethyl ether of 19-hydroxy-$\Delta^4$-androstene-3,17-dione.

References Cited in the file of this patent

UNITED STATES PATENTS

| | | |
|---|---|---|
| 2,518,672 | Ehrenstein | Aug. 15, 1950 |
| 2,609,377 | Ehrenstein | Sept. 2, 1952 |
| 2,658,022 | Haines | Nov. 3, 1953 |
| 2,671,752 | Zaffaroni | Mar. 9, 1954 |
| 2,686,790 | Ehrenstein | Aug. 17, 1954 |
| 2,713,587 | Bergstrom | July 19, 1955 |
| 2,763,671 | Fried et al. | Sept. 18, 1956 |
| 2,819,276 | Mihina | Jan. 7, 1958 |
| 2,819,277 | Colton | Jan. 7, 1958 |
| 2,856,415 | Mihina | Oct. 14, 1958 |

OTHER REFERENCES

Herzog et al.: J. Org. Chem., vol. 17 (1952), pages 713–723.